Jan. 1, 1929.　　　　　　　　　　　　　　　　　　　1,697,120
L. JOHNS
ARTIFICIAL BAIT
Filed Aug. 31, 1927
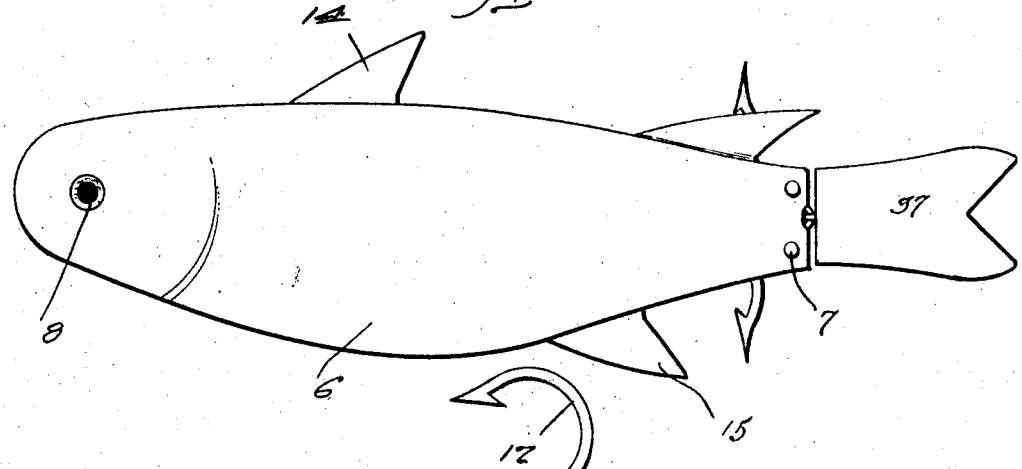
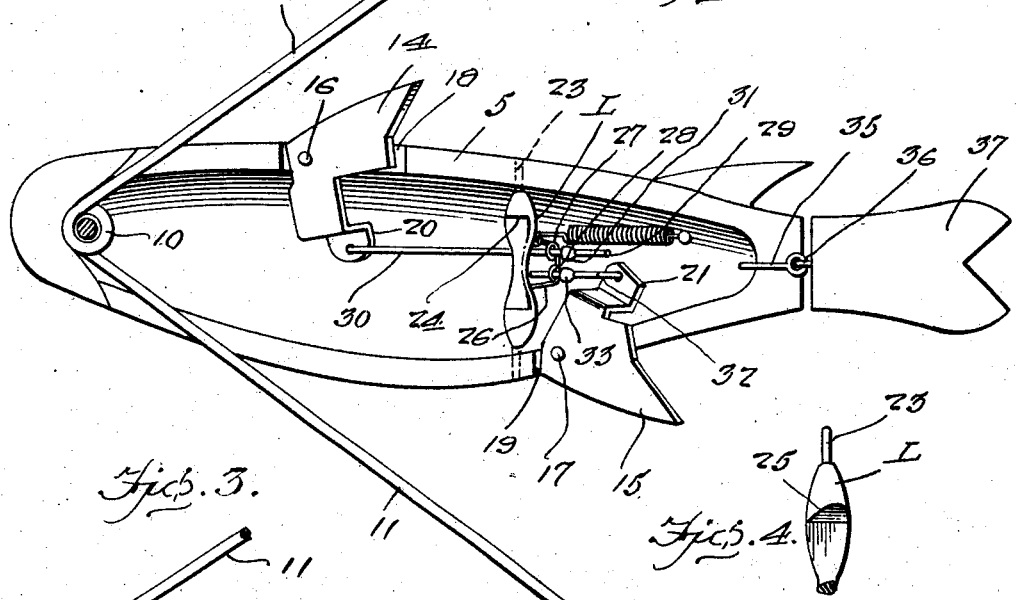
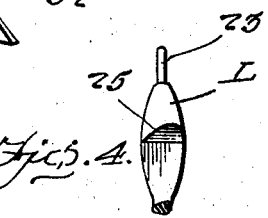
Inventor
Lee Johns
By Clarence A. O'Brien
Attorney Patented Jan. 1, 1929.

1,697,120

UNITED STATES PATENT OFFICE.

LEE JOHNS, OF MIAMI, FLORIDA.

ARTIFICIAL BAIT.

Application filed August 31, 1927. Serial No. 216,635.

The present invention relates to artificial bait designed particularly for catching sea fish and tarpons.

A very important object of the invention resides in the provision of an artificial bait of this nature having a hook structure incorporated therein releasable by protrusions preferably in the form of imitation fins.

Another very important object of the invention resides in the provision of a structure of this nature wherein a plurality of fin protrusions are provided, the actuation of either one of which will release the hook structure.

Another very important object of the invention resides in the provision of an artificial bait structure having spring hooks incorporated therein held in a contracted position by a latch structure which is easy to set.

A still further important object of the invention resides in the provision of an artificial bait of this nature which is simple in its construction, inexpensive to manufacture, strong and durable, compact, convenient to manipulate, and thoroughly efficient and reliable in operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is an elevation of the bait embodying the features of my invention,

Figure 2 is a perspective view of the bait showing one section of the casing removed, Figure 3 is a fragmentary detail perspective view showing the coil of the spring hook structure, and, Figure 4 is a detail fragmentary elevation showing the release latch.

Referring to the drawing in detail it will be seen that the numeral 5 denotes one section of the casing and the numeral 6 the other section thereof. These sections are held together by suitable fastening elements 7 and 8. When the sections are fixed together they simulate a bait such as a fish or the like. I do not desire to be limited to the simulation of any particular kind of bait and the illustration in the drawing, therefore, is merely by way of example. The fastening element 8 is preferably in the form of a pin. An elongated strand of spring material is bent intermediate its ends to provide a coil 10 comprising a plurality of convolutions as is clearly shown in Figure 3, which convolutions are wound about the pin 8. The strand further includes jaws or arms 11 merging from the coil 10 and terminating in hooks 12. The casing is hollowed out inside so that the hooks may be contracted to the position shown in Figure 1, the normal position, however, being shown in Figure 2, it being understood that the convolutions forming the coil 10 tend to spread the jaws or arms 11 to a diverging position with the hooks 12 a considerable distance apart from each other as compared to their relatively close position together as is shown in Figure 1. A pair of protrusions 14 and 15 are pivoted as at 16 and 17 respectively in recesses 18 and 19 respectively.

These protrusions are in the form of levers being pivoted intermediate their ends and the exposed or outer portions thereof are preferably constructed in simulation of fins of a fish or protruding parts of the kind of bait the casing may simulate. The inner ends of the protrusions are offset respectively as at 20 and 21 to form lips which are apertured. A latch structure L is formed with co-axial end pintles 23 which are journaled in the section 5 so that the latch extends transversely across the casing. The body of this latch structure L is formed with a pair of shoulders 24 one adjacent each end thereof and these shoulders have one end cut away as at 25. When the jaws or arms 11 are bent inwardly of the casing they will catch on the shoulders 24 and be held in the casing in the set position. A relatively stiff wire or the like 26 is engaged with the body of the latch L and forms a crank with a pair of eyes 27 and 28. A spring 29 is engaged with the body of the latch and with the section 5 so as to normally hold the latch structure L in its set position. A rod 30 is engaged with the lip 20 and extends through the eye 27 and has a protrusion or enlargement 31 thereon so that by rocking the protrusion 14 the rod 30 is pulled and the protrusion 31 engages the eye 27 to swing the crank wire 26 and rock the latch structure L against the tension of the spring 29 so as to release the jaw arms 11 and allow the hooks 12 to fly outwardly. A rod 32 is engaged with the lip 21 and is slidable through the eye 28 and has a protrusion 33 so that when the protrusion 15 is rocked inwardly, the rod 32 is pushed and will engage the protrusion 33 with the eye 28 to rock the crank wire 26 and rock the latch structure L for releasing the arms 11. It will be seen that the protrusions will act individually or simultaneously to cause the release of the hook structure.

In order to simulate a fish or like bait, more exactly, I provide an eye bolt 35 in the rear end thereof and engage therewith another eye bolt 36 fixed in a tail simulating structure 37 so that this will imitate the movement of a fish moving through the water.

It is thought that the construction, operation, utility and advantages of the invention will now be quite apparent to those skilled in this art without a more detailed description thereof. The present embodiment of the invention has been disclosed in detail merely by way of example since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

1. In an artificial bait structure of the class described, a casing, a hook arm mounted in the casing and including means for normally urging it outwardly of the casing, a latch structure rotatable in the casing transversely thereof and having a shoulder to engage the arm to hold the arm inwardly of the casing, a spring engaged with the latch to normally hold the latch in an engaging position, and means for releasing the latch.

2. In an artificial bait structure of the class described, a casing, a hook arm mounted in the casing and including means for normally urging it outwardly of the casing, a latch structure rotatable in the casing transversely thereof and having a shoulder to engage the arm to hold the arm inwardly of the casing, a crank extending from the latch, a spring engaged with the latch to normally hold the latch in an engaging position, a protrusion in the casing, means pivotally mounting the protrusion in the casing, a rod engaged with the inner end of the protrusion, said crank having an eye through which the rod is slidable, an abutment on the rod engageable with the eye to rock the crank and latch for releasing the arm upon actuation of the protrusion.

3. In an artificial bait structure of the class described, a hollow casing, a pair of arms mounted in the casing and having hooks at their outer ends, means incorporated in the arms for normally urging them outwardly of the casing, a latch, means for rotatably mounting the latch in the casing transversely thereof, said latch having a pair of shoulders to engage the arms and hold them inwardly of the casing, a crank extending from the latch and having a pair of eyes, a pair of rods slidable through the eyes, and a pair of protrusions pivotally mounted in recesses formed in the casing to provide outer ends and inner ends, said rods being engaged with the inner ends.

4. In an artificial bait structure of the class described, a hollow casing, a pair of arms mounted in the casing and having hooks at their outer ends, means incorporated in the arms for normally urging them outwardly of the casing, a latch, means for rotatably mounting the latch in the casing transversely thereof, said latch having a pair of shoulders to engage the arms and hold them inwardly of the casing, a crank extending from the latch and having a pair of eyes, a pair of rods slidable through the eyes, a pair of protrusions pivotally mounted in recesses formed in the casing to provide outer ends and inner ends, said rods being engaged with the inner ends, and a spring engaged with the latch to normally hold the same in an engaged position.

5. In an artificial bait structure of the class described, a casing, a pair of hook arms mounted in the casing and including means for urging them outwardly of the casing, a latch structure rockable in the casing transversely thereof and having shoulders to engage the arms to hold the arms inwardly of the casing, a crank extending from the latch, a pair of protrusions rockably mounted in the casing, lost motion means connecting the protrusions with the cranks, whereby either protrusion may be actuated for rocking the latch without causing the operation of the other protrusion, and means normally urging the latch in an engaging position.

In testimony whereof I affix my signature.

LEE JOHNS.